March 31, 1970      D. R. PENDSE      3,503,787
METHOD OF MAKING REFRACTORY ALUMINUM NITRIDE COATINGS
Filed Jan. 31, 1967
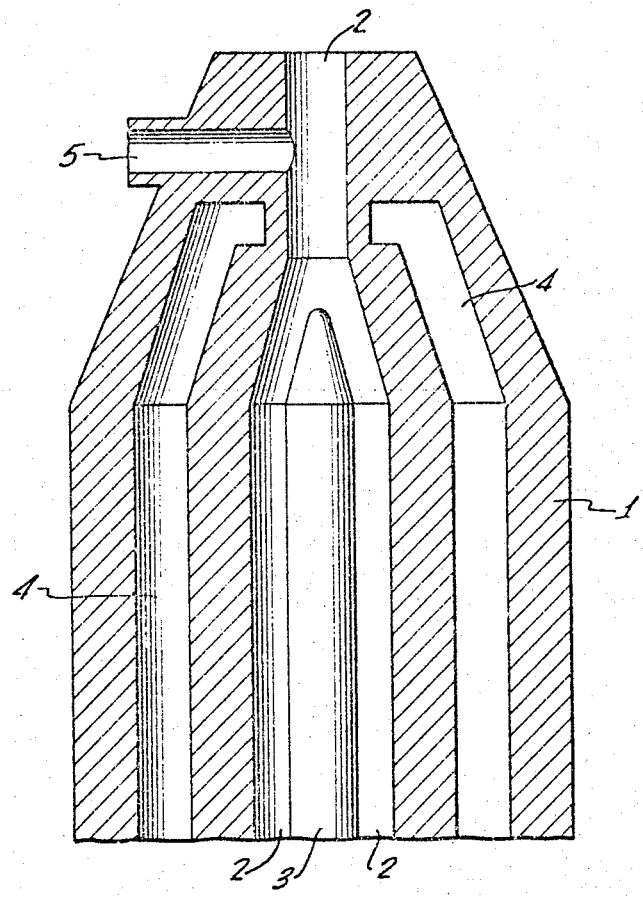
DEODATTA RAGHUNATH PENDSE
INVENTOR
BY James R. Thornton
AGENT 3,503,787
METHOD OF MAKING REFRACTORY ALUMINUM NITRIDE COATINGS
Deodatta Raghunath Pendse, Thames Ditton, Surrey, England, assignor to United States Borax & Chemical Corporation, Los Angeles, Calif.
Filed Jan. 31, 1967, Ser. No. 613,010
Claims priority, application Great Britain, Feb. 11, 1966, 6,040/66
Int. Cl. C23c 11/14, 11/10; C21d 1/74
U.S. Cl. 117—93.1           7 Claims

ABSTRACT OF THE DISCLOSURE

A method of applying an aluminum nitride coating on a substrate which comprises plasma flame spraying aluminum onto the substrate using a nitrogen gas plasma whereby a mixed coating of aluminum and aluminum nitride is formed. The coating is then nitrided by heat treatment in nitrogen in the presence of a catalyst such as lithium fluoride.

---

This invention relates to refractory nitrides and, more particularly, to refractory nitride coatings.

A number of refractory nitrides, particularly those of aluminum, silicon and titanium, are well known for their high resistance to attack by molten metals such as aluminum, gallium, cadmium, and zinc. They are however expensive materials to produce and it is exceedingly difficult to fabricate equipment from such refractory nitrides by the usual compaction techniques.

When such refractory nitrides are employed mainly for their resistance to molten metals they can be used as a thin layer coated upon a suitable refractory substrate, such as aluminous concrete (a ceramic material high in $Al_2O_3$), which is inexpensive and provides the necessary mechanical strength. Other substrates such as steel and graphite can also be used.

An object of the present invention is to provide a method whereby a comparatively inexpensive refractory substrate, such as aluminous concrete, may be coated with a thin layer of a refractory nitride.

According to the present invention there is provided a method of forming on a substrate a coating of a refractory nitride which comprises depositing the nitride on the substrate from a highly ionized gas (plasma) which is sprayed onto the substrate. The gas forming the plasma should be one that does not react with the substrate and that permits the formation of the nitride when this is present as its dissociated elements, nitrogen being preferred.

The nitride may be fed into the plasma in finely divided or rod form and be carried by the plasma to the substrate. Preferably however the nitride is formed in the plasma by feeding into a plasma of nitrogen a metal or other element which will react with the nitrogen to form the desired nitride. The metal or other element is in this case fed either in elemental form or in the form of a compound which will decompose in the plasma to yield the desired metal or other element which then reacts with the nitrogen. When it is desired to form titanium nitride, an appropriate compound which will decompose in the plasma is titanium hydride. Other metals which can be used are aluminum and silicon.

When the nitride, metal or other element in elemental form, or decomposible compound is fed into the plasma as a finely divided powder it is most suitably a powder having a particle size of about 200 BS mesh, and may be suspended in an inert carrier gas, preferably nitrogen.

The plasma can be formed with a plasma generator such as a conventional plasma torch, in which an arc is struck between two electrodes and the gas to be ionized is blown through the arc. It is then preferred to feed the material to be deposited into the gas after the gas has been ionized by the arc. Alternatively, as when the nitride to be coated is aluminum nitride, the plasma may be formed by ionization of nitrogen between two electrodes one of which is a sacrificial electrode, the sacrificial electrode being the element, such as aluminum, which is to form the nitride.

The invention will now be described with reference to the accompanying drawing which is a sectional side elevation of a plasma torch.

The torch comprises a forwardly tapered generally cylindrical casing 1 having an axial bore 2 which is open at its forward end and communicates at its rear end with an axial counter bore wherein there is an axially extending electrode 3 provided with internal cooling means. The wall of the casing surrounding the electrode is hollow 4 to provide a passage for cooling liquid. A radial extending inlet passage 5 communicates with the bore in the forward portion of the casing.

In use of the torch, the electrode and the casing are connected to respective terminals of a source of electric current, and a stream of argon is fed forwardly through the counter bore until a plasma begins to form. The argon is then gradually replaced by nitrogen gas, and powdered metal is fed into the nitrogen plasma through the inlet passage.

EXAMPLE I

In one experiment, the following conditions were used: arc voltage, 130 volts; arc current, 200 amps; feed rate, 4 grams per minute; powder size, 180–250 mesh; powder, aluminum. The plasma laden with aluminum nitride was sprayed under an atmosphere of nitrogen onto a shallow crucible of fired, refractory aluminous cement and formed a strongly adherent, uniformly grey coating about 0.5 mm. thick. The coating and the cement substrate showed no sign of damage when molten aluminum was evaporated therefrom.

EXAMPLE II

In a similar run, aluminum powder was sprayed on a substrate of steel, which had been sandblasted, at an arc current of 150 amps. The resultant coating was aluminum with some aluminum nitride. The coating can be nitrided further by heat treatment in nitrogen in the presence of lithium fluoride catalyst.

EXAMPLE III

In a similar run, a composition consisting of 85% aluminum nitride and 15% aluminum was sprayed on a polished graphite substrate using an arc voltage of 75 volts and arc current of 300 amps. A good adherent coating was obtained.

Various changes and modifications of the invention can be made and, to the extent that such variations incorporate the spirit of this invention, they are intended to be included within the scope of the appended claims.

What is claimed is:

1. The method of forming a coating of aluminum nitride on a substrate which comprises feeding aluminum to a plasma of nitrogen, depositing a mixture of aluminum and aluminum nitride as a coating on said substrate, and nitriding said resultant coating by heat treatment in nitrogen in the presence of a catalyst.

2. The method according to claim 1 in which said catalyst is lithium fluoride.

3. The method according to claim 1 in which said substrate is selected from the group consisting of steel, graphite and an alumina ceramic.

4. The method according to claim 1 in which said coating is about 0.5 mm. thick.

5. The method according to claim 1 in which said substrate is steel.

6. The method according to claim 1 in which said substrate is graphite.

7. The method according to claim 1 in which said substrate is an alumina ceramic.

References Cited

UNITED STATES PATENTS

| | | | |
|---|---|---|---|
| 2,201,049 | 5/1940 | Moore | 117—5.3 X |
| 2,755,199 | 7/1956 | Rossheim et al. | 117—129 X |
| 3,041,690 | 7/1962 | Mytton et al. | 117—5.1 X |
| 3,114,826 | 12/1963 | Sullivan. | |
| 3,275,408 | 9/1966 | Winterburn | 117—105.2 X |
| 3,419,404 | 12/1968 | Mao | 106—65 |

FOREIGN PATENTS 863,190  3/1961  Great Britain.

OTHER REFERENCES

Marynowski et al.: "Thermodynamics of Selected Chemical Systems Potentially Applicable to Plasma Jet Synthesis," I&EC Fundamentals, vol. 1, No. 1, p. 52, February 1962.

ALFRED L. LEAVITT, Primary Examiner

J. H. NEWSOME, Assistant Examiner

U.S. Cl. X.R.

117—129, 228; 148—6.35, 16.6, 20.3